O. ABBADINI.
SEPARABLE RIM.
APPLICATION FILED MAY 25, 1918.
1,335,778.
Patented Apr. 6, 1920.
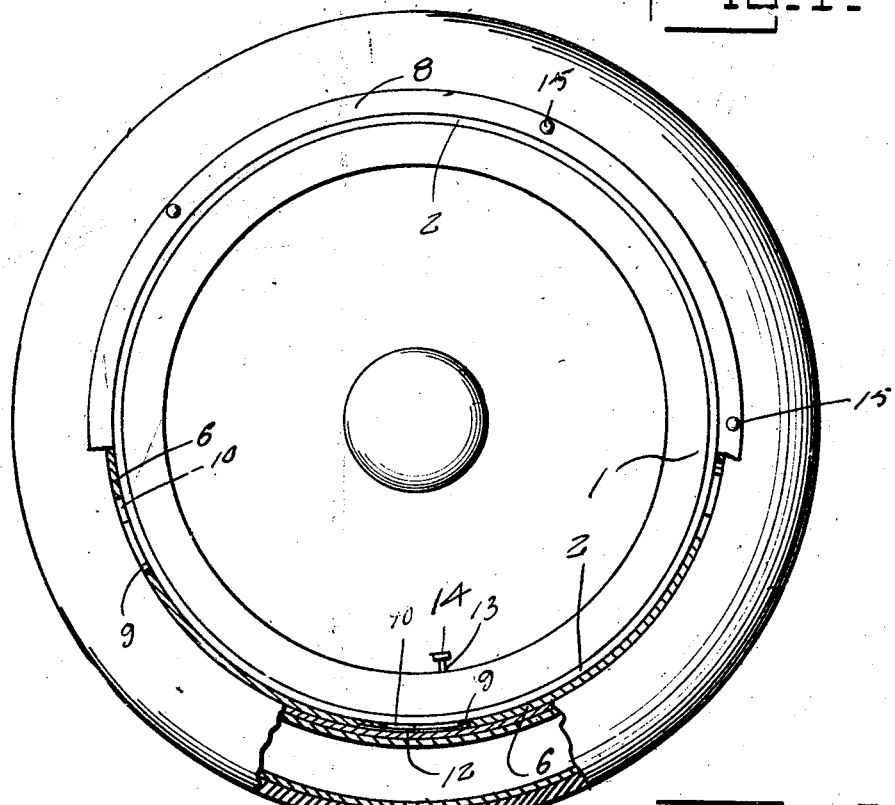
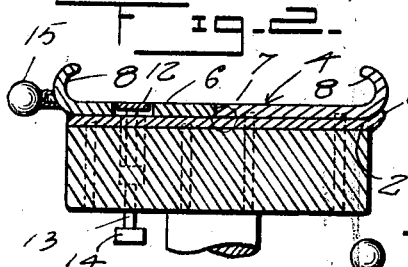
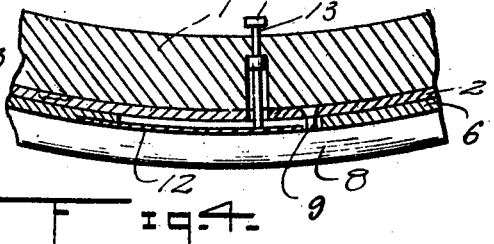
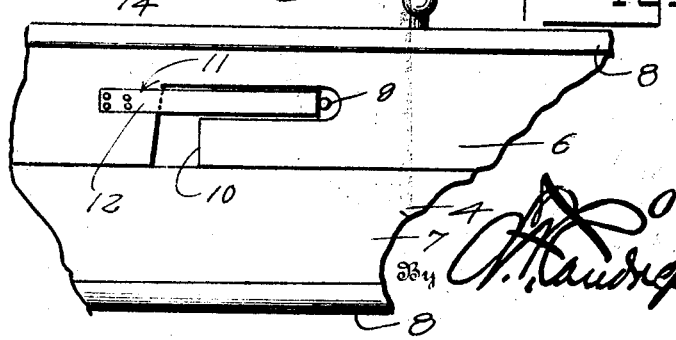
Inventor
O. Abbadini,
By
Attorney

UNITED STATES PATENT OFFICE.

ORGERIO ABBADINI, OF FAIRBANKS, PENNSYLVANIA.

SEPARABLE RIM.

1,335,778.

Specification of Letters Patent.  Patented Apr. 6, 1920.

Application filed May 25, 1918. Serial No. 236,578.

*To all whom it may concern:*

Be it known that I, ORGERIO ABBADINI, a citizen of the United States, residing at Fairbanks, in the county of Fayette and State of Pennsylvania, have invented certain new and useful Improvements in Separable Rims; and I do hereby declare the following to be a full, clear, and exact description of the invention, such as will enable others skilled in the art to which it appertains to make and use the same.

This invention relates to improvements in separable rims for automobile tires, and has for one of its objects the provision of a device of this character, wherein a tire can be readily removed and replaced on the rim without the use of tools especially adaptable for the purpose, and thereby obviating the stretching of the tire which is now frequent when forcing a tire onto an ordinary rim with tools.

Another object of this invention is the provision of a rim constructed of a pair of sections, which sections may be readily separated, whereby a tire can be readily and conveniently applied upon the sections when in a separated position without the use of tools.

A further object of this invention is the provision of novel means for locking one of the sections of the rim to the felly, and which means can be readily actuated without the use of suitable tools for the purpose.

A still further object of this invention is the provision of a separable rim of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the accompanying description and accompanying drawing, in which:

Figure 1 is a front elevation, partly in section, of a separable rim constructed in accordance with my invention, Fig. 2 is a transverse sectional view of the same, Fig. 3 is a fragmentary longitudinal sectional view, illustrating the manner of operating the spring catches.

Fig. 4 is a fragmentary view, illustrating the spring catches.

Referring in detail to the drawing, the numeral 1 indicates the felly of a wheel, on which is mounted the usual rim 2, having formed upon one edge a rim-engaging flange 3 for engagement with a separable rim 4.

The separable rim 4, which constitutes my invention, consists of sections 6 and 7 each provided with a tire-engaging flange 8 of any desired construction. The section 7 is secured firmly to the rim 2 by suitable bolts or like fasteners, and the rim 2 is provided with a plurality of pins 9 upon its outer face adapted to be received by bayonet slots 10 in the section 6. In assembling, a tire is placed on the section 7, and the section 6 is placed on the rim 2 under the tire and the pins are first moved into the transverse branches of the bayonet slots 10, and then the section 6 is moved or turned circumferentially with relation to the section 7, so as to move the pins 9 into the longitudinally extending branches of the bayonet slots, thus firmly locking the section 6 on the rim 2 and in engagement with the section 7.

Any number of spring catches 11 may be employed for holding the pins 9 in the longitudinally extending branches of the bayonet slots 10 for preventing the section 6 from moving circumferentially with relation to the section 7 and which would be liable to place the pins 9 in registration with the transverse branches of the bayonet slots, so that the section 6 might become accidentally detached. Each of the spring catches 11 consist of a resilient strip 12, which is secured to the section 6 of the rim at one of its ends while at its opposite end is disposed over the longitudinally extending branch of the bayonet slot with its free end in engagement with the pin 9 preventing said pin from moving in the longitudinal branch. An operating pin or bolt 13 is provided with a head 14, and engages the resilient strip 12 and extends through an opening in the felly 1 and rim 2, so that upon pressing upon the head 14, the resilient strip 12 will be raised upwardly, permitting the pin to pass thereunder when the section 6 is turned circumferentially with relation to the section 7, permitting it to be removed so that the tire can be readily pulled off of the section 7.

A pair of detachable hand grips 15 are carried by the section 6, so that said section may be readily gripped for the purpose of turning or moving the same circumferentially with relation to the section 7 for removing the same.

While I have shown and described the preferred embodiment of my invention, it will be understood that minor changes in construction, combination and arrangement of parts may be made without departing from the spirit and scope of my invention as claimed.

Having thus described my invention, what I claim is:

A separable rim including a felly band and a felly, a pair of rim sections, means securing one of the sections permanently to the felly band and the other section having bayonet slots, pins secured to the felly band and received by the slots, spring catches secured at one of their ends to the last named section and having their other ends disposed against the pins, operating pins slidable in the felly band and felly and engaging the spring catches, and spaced heads formed on the operating pins for limiting the movement of said operating pins through the felly.

In testimony whereof I affix my signature in presence of two witnesses.

ORGERIO ABBADINI.

Witnesses:
  F. R. LYNCH,
  W. M. HOUGH.